United States Patent [19]

Sellstrom et al.

[11] Patent Number: 4,853,456

[45] Date of Patent: Aug. 1, 1989

[54] AMIDOAMINE CO-CURATIVES IN EPOXY THERMOSET ADHESIVES

[75] Inventors: Kathy B. Sellstrom, Pflugerville; Terry L. Renken, Austin, both of Tex.

[73] Assignee: Texaco Chemical Company, White Plains, N.Y.

[21] Appl. No.: 157,757

[22] Filed: Feb. 19, 1988

[51] Int. Cl.$^4$ .............................................. C08G 59/54
[52] U.S. Cl. ...................................... 528/111; 525/504; 528/365; 528/407
[58] Field of Search ................. 528/111, 407; 525/504

[56] References Cited

U.S. PATENT DOCUMENTS

| | | | |
|---|---|---|---|
| 3,257,342 | 6/1966 | Kwong | 528/111 X |
| 4,070,225 | 1/1978 | Batdorf | 428/414 X |
| 4,082,708 | 4/1978 | Mehta | 528/111.3 |
| 4,115,360 | 9/1978 | Schulze et al. | 528/111 X |
| 4,119,615 | 10/1978 | Schulze | 528/343 |
| 4,133,803 | 1/1979 | Klein | 528/343 X |
| 4,146,700 | 3/1979 | Waddill et al. | 528/111 X |
| 4,147,857 | 4/1979 | Waddill et al. | 528/111 X |
| 4,169,177 | 9/1979 | Waddill et al. | 528/111 X |
| 4,179,418 | 12/1979 | Waddill et al. | 528/111 X |
| 4,304,889 | 12/1981 | Waddill et al. | 528/111 X |
| 4,420,606 | 12/1983 | Waddill | 528/111 |
| 4,518,749 | 5/1985 | Waddill et al. | 528/111 X |
| 4,533,719 | 8/1985 | Waddill | 528/111 |

*Primary Examiner*—Earl Nielsen
*Attorney, Agent, or Firm*—Jack H. Park; Kenneth R. Priem; Richard A. Morgan

[57] ABSTRACT

The invention is an epoxy resin thermoset adhesive composition. The composition comprises the cured reaction product of:

(A) an epoxy base resin, and
(B) a curing amount of an admixture comprising:
  1. an amidoamine of the formula:

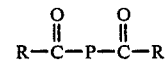

wherein: P is an iso or para phenylene moiety, and R is the polyoxypropylene moiety of the formula:

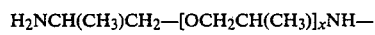

wherein: x ranges from 2 to 40, and
  2. an aliphatic polyetheramine, aromatic amine or mixture thereof.

The compositions cured at elevated temperature crosslink to form adhesives demonstrating high peel strength and high shear strength.

7 Claims, No Drawings

AMIDOAMINE CO-CURATIVES IN EPOXY THERMOSET ADHESIVES

CROSS-REFERENCE TO RELATED APPLICATIONS

This application is related to an application titled Oxamidoamine Co-curatives in Epoxy Thermoset Adhesives by K. B. Sellstrom and D. C. Alexander, Ser. No. 157,758 filed on even date.

BACKGROUND OF THE INVENTION

1. Field of the Invention

The invention relates to amidoamines prepared from isophthalic acid or terephthalic acid and a polyoxypropyleneamine as co-curatives with aliphatic polyetheramines, aromatic amines or mixtures thereof in epoxy resin thermoset adhesives.

2. Description of Other Relevant Materials in the Field

Epoxy resins constitute a broad class of polymeric materials having a wide range of physical properties. The resins are characterized by epoxide groups which are cured by reaction with curing agents selected to provide cured epoxy resin compositions with certain desirable properties.

U.S. Pat. No. 3,257,342 to J. N. S. Kwong teaches a thermoset epoxy resin composition comprising a polyglycidyl ether, an amino-terminated polyamide of (a) polymeric fatty acids and aliphatic dicarboxylic acid and (b) a polyoxyalkylenediamine. Particularly preferred are dimer fatty acids or mixed dimer and trimer acids. When aliphatic dicarboxylic acids wherein the carboxyl groups are separated by a chain of about 2 to 8 carbon atoms are incorporated, these short chain dicarboxylic acids are preferably pre-reacted with a polyoxyalkylene component.

U.S. Pat. No. 4,070,225 to V. H. Batdorf describes a latent or slow-curing adhesive system formulated from an epoxy resin and a primary amine-terminated polyamide. The polyamide was prepared from a polymeric tall oil fatty acid, a polyoxypropyleneamine, 1,4-bis-aminopropyl piperazine, and ethylenediamine.

U.S. Pat. No. 4,082,708 to R. Mehta describes polyamide curatives of epoxy resins prepared from 1,4-bis(3-aminopropyl)piperazine, dimerized tall oil fatty acids, polyoxypropylenediamine, and ethylenediamine or piperazine. The polyamide was used with EPON® 828 as a metal-to-metal adhesive.

U.S. Pat. No. 4,133,803 to H. P. Klein teaches a thermoplastic adhesive consisting essentially of the amide reaction product of a polyoxypropylene polyamine and an aliphatic or aromatic hydrocarbon dicarboxylic acid, ester or anhydride, e.g. oxalic acid. The polyamide reaction product is prepared by mixing and reacting the polyoxypropylene polyamine and carboxylic acid, ester or anhydride at a specified temperature. The adhesives are of the thermoplastic (hot-melt) type and comprise a small amount of the epoxy resin.

U.S. Pat. No. 4,119,615 to H. Schulze teaches resinous polyoxamide thermoplastic adhesives formed by reacting one mole of a polyoxypropylene polyamine with 1 to 4 moles of oxalic acid or a lower alkyl mono or diester of oxalic acid to form a liquid prepolymer. The prepolymer is reacted with 0.5 to 1.5 moles of a hydrocarbon diamine to form the resinous polyoxamide. The prepolymer is not amine functional. The reaction product is reacted with an amine to form the thermoplastic adhesive.

U.S. Pat. No. 4,518,749 to H. G. Waddill and H. Schulze teaches epoxy resin curatives comprising a polyepoxide and a curing amount of a bis(hydrogen maleate)derivative of a polyoxypropylenediamine.

U.S. Pat. No. 4,115,360 to H. Schulze and H. G. Waddill teaches epoxy resin adhesives comprising a vicinal polyepoxide, a curing amount of an amine curing agent and an effective amount of a polyether ureylene having terminal amino groups.

U.S. Pat. No. 4,169,177 to H. G. Waddill and H. Schulze teaches epoxy resin compositions comprising a vicinal polyepoxide, a curing amount of a substituted bicyclic anhydride and an effective amount of a diamide of a polyoxyalkylenepolyamine-urea condensate.

U.S. Pat. No. 4,304,889 to H. G. Waddill and H. Schulze teaches a solvent resistant epoxy resin composition comprising a vicinal polyepoxide, an aromatic polyamine and the condensation product of a low molecular weight polyoxyalkylenediamine with at least 2 moles of maleic anhydride. The inclusion of minor amounts of polyoxyalkylene amines improves properties of the resulting composition.

SUMMARY OF THE INVENTION

The invention is an epoxy resin adhesive composition. The thermoset adhesive composition comprises a base resin cured with an adhesion promoting curative admixture. The curative admixture comprises an amidoamine of the formula:

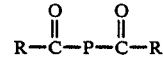

wherein: P is an iso or para phenylene radical, and R is the polyoxypropylene moiety of the formula:

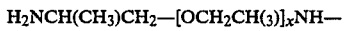

wherein: x ranges from 2 to 40. The co-curative of the admixture comprises an aliphatic polyetheramine, aromatic amine or mixture thereof.

DESCRIPTION OF THE PREFERRED EMBODIMENTS

The invention is an improvement in U.S. Pat. No. 3,257,342 to J. N. S. Kwong, incorporated herein by reference.

An improved epoxy formulation has been developed. The adhesive properties of a series of amidoamines is improved by incorporating as a co-curative aliphatic polyetheramines, aromatic amines or a mixture thereof. On curing, this admixture of curatives produces an adhesive composition with high peel strength as well as high shear strength.

The vicinal polyepoxides which are cured with the curative admixture of the invention are aromatic organic materials having an average of at least 1.8 reactive 1,2-epoxy groups per molecule. These polyepoxide materials can be monomeric or polymeric, monoaromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight (EEW) of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2,3 epoxy propoxy) phenyl] propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane,
3,3'-dihydroxydiphenyldiethylmethane,
3,4'-dihydroxydiphenylmethylpropylmethane,
2,3'-dihydroxydiphenylethylphenylmethane,
4'-dihydroxydiphenylpropylphenylmethane,
4,4'-dihydroxydiphenylbutylphenylmethane,
2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, 2,2-bis(4-hydroxycyclohexyl)propane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2', 3,3'-tetrahydroxdipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in H. Lee, and K. Neville, *Handbook of Epoxy Resins*. McGraw Hill Book Co., New York, 1967.

It will be appreciated by those skilled in the art that the vicinal polyepoxide compounds which are useful according to the practice of the present invention are not limited to those containing the above-described polyepoxides, but that these polyepoxides are to be considered merely as being representative of the class of vicinal polyepoxides as a whole.

The amidoamines are prepared according to the synthesis in Example 1, by reacting a one molar quantity of either terephthalic acid (para-phthalic acid) or isophthalic acid with two molar quantities of a polyoxypropylenediamine of the formula:

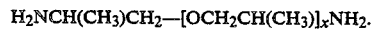

These diamines are commercially available in average molecular weights of about 230 to 2000, with x averaging from about 2.6 to 33.1.

The aliphatic polyetheramines which can be utilized as co-curatives in accordance with the instant invention are generally any of those amine curing agents which are well known to be useful for the curing of vicinal epoxides. Generally, those curing agents having at least three reactive amino hydrogens are useful.

Of the amine curing agents known to be effective in curing a vicinal epoxy resin, preferred curing agents in accordance with the instant invention are the polyoxyalkylene containing amine compounds. A preferred class of polyoxyalkylene polyamines is of the formula:

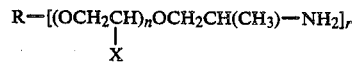

wherein X is hydrogen, methyl or ethyl radical; R is the nucleus of an oxyalkylation susceptible polyhydric alcohol containing 2 to 12 carbon atoms and 2 to 8 hydroxyl groups; n is a number ranging from 1 to about 15 and r is a number ranging from 2 to 4.

The most preferred polyoxyalkylenepolyamines are a polyoxypropylenediamine having a molecular weight of about 230 to 400 and a triamine of molecular weight about 400. These products are available under the tradename JEFFAMINE ® D-230, JEFFAMINE ® D-400 and JEFFAMINE ® T-403 from Texaco Chemical Co. Their use as curing agents is described in U.S. Pat. No. 4,189,564.

JEFFAMINE ® D-230 is represented by the formula:

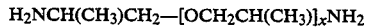

wherein x averages 2.6

JEFFAMINE ® T-403 is represented by the formula:

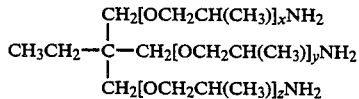

wherein x+y+z averages 5.3.

The aromatic amine co-curatives of the present invention include those compounds known to be useful in curing a vicinal polyepoxide.

These aromatic amines include the alkylene-linked polyphenylamines, phenylene diamines and polycyclic or fused aromatic primary amine compounds. Further, the corresponding cycloaliphatic amines, e.g., the above hydrogenated aromatic compounds can be utilized.

Preferred aromatic amine curing agents include the aromatic diamine obtained by replacing two nuclear hydrogen atoms of an aromatic hydrocarbon by —NH₂ groups said aromatic hydrocarbon having from 6 to 12 aromatic carbon atoms, inclusive, and is inclusive of phenylene, tolylene, naphthylene, and aromatic diamines having the formula:

$$H_2N-Ph-X-Ph-NH_2$$

wherein Ph is a phenylene radical, X is selected from the group consisting of a single bond, $-SO_2-$, $-(C=O)-$, $-O-$, and lower alkylenes having from 1 to 4 carbon atoms; e.g. methylene, ethylene, propylene, butylene, and isomeric forms thereof, or lower alkyls having from 1 to 4 carbon atoms; e.g. methyl, ethyl, propyl, butyl, and isomeric forms thereof.

Prior to use the co-curative is admixed with the amidoamine. In general, small to moderate amounts of the co-curative are used for the lower molecular weight amidoamines. The more flexible higher molecular weight adducts require higher amounts of the co-curative.

It has been found that the only satisfactory method for determining the proper ratio of amidoamine and co-curative involves actually preparing a series of admixtures containing the materials being considered for use in a particular application in various concentrations and then reacting the admixture with a vicinal polyepoxide and curing the reaction product at, for example, 1 hour at 125° C. The examples show ratios of amidoamine:co-curative of 1:1 to 20:1. The properties of cured castings and adhesion properties are then tested as described in Example 2 by standard ASTM methods. The sample with the desired properties for the specific application may then be chosen and an additional set of samples tested over a narrowed range containing the chosen sample in order to produce a custom formulation with desired properties.

By this method, guidelines have been determined in formulating adhesives of the instant invention. In the amidoamine comprising polyoxypropyleneamines of the formula:

$$H_2NCH(CH_3)Ch_2-[OCH_2CH(CH_3)]_xNH_2$$

wherein y averages about 2.6 or about 5.6, that criticality has been found in the ratio amidoamine:co-curative. It has been found that adhesives comprising less amidoamine than a 1:1 ratio demonstrated reduced peel strength. Adhesives comprising less co-curative than a 25:1 ratio demonstrated reduced shear strength. Accordingly, the range of 1:1 to 25:1 yields effective thermoset adhesives of high peel strength and high shear strength.

Amidoamines represented by the formula wherein y averages 33.1 have been found to be effective in an amido:co-curative ratio of 1:1 to 10:1. It is postulated that the long polyoxypropylene chain is much more flexible than a shorter chain and hence the adhesives lose shear strength with larger amounts of long chain amidoamine. By the same theory a more flexible polyoxypropylene chain would not lose peel strength, and none was detected. Accordingly, in the amidoamine wherein x ranges from 25 to 40, an amidoamine:co-curative ratio of 1:1 to 10:1 is recommended. Amidoamines comprising shorter chain polyoxypropyleneamines have demonstrated criticality over the wider 1:1 to 25:1 range.

The curative agent is usually added to the formulation in such an amount that there is one reactive hydrogen atom in the curing component for each epoxy group in the epoxy resin component. These are known as stoichiometric quantities. The stoichiometric quantity can be calculated from the knowledge of the chemical structure and analytical data on the component. Unfortunately, stoichiometry is not always calculable. For systems of the present invention, the proper amount of curative is the amount necessary to provide the best desired properties. This amount must be determined experimentally and can be accomplished by routine procedures known in the art. Generally the number of equivalents of reactive curative groups is from about 0.8 to 1.2 times the number of epoxide equivalents present in the curable epoxy resin composition, with from 0.9 to a stoichiometric amount being preferred. The exact amount of constituents in accordance with the above general requirements will depend, as mentioned, primarily on the application for which the cured resin is intended.

These epoxy systems may be cured rapidly with heat to provide a high degree of heat resistance along with a measure of flexibility. The curing temperature range acceptable in this invention is from about 60° C. to about 155° C. for up to 2 hours. Preferably curing is done at about 125° C. for about 1 hour.

As adhesives, epoxy resins cured with amidoamines usually have high lap shear strength or high peel strength but not both. Addition of flexibilizing additives normally causes some improvement in peel strength but lowers shear strength dramatically. The inventive amidoamines admixed with an aromatic amine and/or aliphatic polyetheramine and reacted with a vicinal polyepoxide resulted in epoxy adhesives with high peel strength as well as high shear strength, shown by way of Example.

EXAMPLE 1

Preoaration of the Amidoamines

The amidoamines were all prepared by the same procedure from one mole of terephthalic or isophthalic acid and two moles of the polyoxypropylenediamine, JEFFAMINE ® D-400 or D-2000. The starting materials were charged to a flask and heated with stirring to 220° to 230° C. for 1–2 hours at atmospheric pressure and then under vacuum at 1 mm Hg for 2 to 4 hours. Most of the water formed in the reaction was removed by distillation. The amidoamines were all slightly yellow liquids with the following compositions and analyses.

| Sample | 6074-55 | 6074-76 | 6054-62 | 6074-77 |
|---|---|---|---|---|
| Diacid | IA | TA | IA | IA |
| Diamine, JEFFAMINE ® | D-2000 | D-400 | D-400 | D-400 |
| Tot. Acetyl., meq/g | 0.496 | 1.87 | 1.81 | 1.85 |
| Tot. Amine, meq/g | 0.49 | 1.94 | 1.80 | 1.88 |
| Prim. Amine, meq/g | 0.45 | 1.85 | 1.72 | 1.77 |
| Sec. Amine, meq/g | 0.02 | 0.06 | 0.06 | 0.09 |
| Tert. Amine, meq/g | 0.02 | 0.03 | 0.02 | 0.02 |
| Water, wt % | 0.04 | 0.08 | 0.12 | 0.04 |

IA = isophthalic acid
TA = terephthalic acid

EXAMPLE 2

Cured Epoxy Properties Obtained with Blends of Isophthalamidoamines or Terephthalamidoamines and Polyoxypropylene Diamines

| | 6109-2C | 6109-18B | 6170-29D |
|---|---|---|---|
| Formulation, pbw | | | |
| Liquid epoxy resin (EEW 188) | 100 | 100 | 100 |
| 6074-55 (JEFFAMINE ® D-2000/IA) | 30.5 | — | — |
| 6074-76 (JEFFAMINE ® D-400/TA) | — | 118.8 | — |
| 6054-62 (JEFFAMINE ® D-400/IA) | — | — | 115.4 |
| JEFFAMINE ® D-230 | 30.5 | — | — |
| JEFFAMINE ® D-400 | — | 13.2 | 12.8 |
| Properties of Cured ⅛-inch Casting: (cured 2 hrs 80° C., 3 hrs 125° C.) | | | |
| Shore D hardness, 0–10 sec | 62–59 | 58–48 | 58–48 |
| Elongation, % | 18.9 | 115 | 97 |
| Heat deflection temp., °C. 264 psi/66 psi load | 55/56 | 30/30 | 29/35 |
| Izod impact strength, ft-lb/in | 0.33 | 0.98 | 1.22 |
| Tensile strength, psi | 5600 | 2800 | 2800 |
| Tensile modulus, psi | 230000 | 79000 | 100000 |
| Flexural strength, psi | 8900 | 2100 | 2200 |
| Flexural modulus, psi | 261000 | 101000 | 80000 |
| Compression strength at failure, psi | 42000 | 46000 | 48000 |
| Adhesion Properties: (cured 1 hr 125° C.) | | | |
| Tensile shear strength, psi | 3400 | 2100 | 2100 |
| T-peel strength, pli | 11.0 | 20.3 | 35.0 |

EXAMPLE 3

Cured Epoxy Properties Obtained with Blends of a Terephthalamidoamine with an Aromatic Amine

| | 6109 | |
|---|---|---|
| | -16A | -16B |
| Formulation, pbw | | |
| Liquid epoxy resin (EEW 188) | 100 | 100 |
| 6074-76 (D-400/Terephthalic acid) | 117.8 | 91.9 |
| Epon ® Curing Agent Y (Shell) | 6.2 | 10.2 |
| Properties of Cured ⅛-inch Castings: (cured 2 hrs 80° C., 3 hrs 125° C. | | |
| Shore D hardness, 0–10 sec | 74–69 | 76–73 |
| Elongation, % | 6 | 3.8 |
| Heat deflection temp., °C. | 43/44 | 46/48 |
| 264 psi/66 psi load | | |
| Izod impact strength, ft-lb/in | 0.15 | 0.12 |
| Tensile strength, psi | 6800 | 8400 |
| Tensile modulus, psi | 350000 | 420000 |
| Flexural strength, psi | 11400 | 14000 |
| Flexural modulus, psi | 370000 | 437000 |
| % wt gain, 24-hr water boil | 3.2 | 3.1 |
| Compression strength at failure, psi | 47000 | 49000 |
| Adhesion Properties: (cured 1 hr 125° C.) | | |
| Tensile shear strength, psi | 3050 | 3580 |
| T-peel strength, pli | 12.1 | 10.3 |

EXAMPLE 4

Cured Epoxy Properties Obtained with Blends of Isophthalamidoamines and an Aromatic Amine

| | 6109-16C | 6109-16D | 6170-29A | 6170-29B |
|---|---|---|---|---|
| Formulation, pbw | | | | |
| Liquid epoxy resin (EEW 188) | 100 | 100 | 100 | 100 |
| 6074-77 (D-400/IA) | 125 | 92.7 | — | — |
| 6054-62 (D-400/IA) | — | — | 114.7 | 90 |
| Epon ® Curing Agent Y (Shell) | 6.6 | 10.3 | 6.0 | 10 |
| Properties of Cured ⅛-inch Castings: (cured 2 hrs 80° C., 3 hrs 125° C. | | | | |
| Shore D hardness, 0–10 sec | 74–69 | 76–72 | 61–55 | 66–62 |
| Elongation, % | 78 | 5.3 | 92 | 4 |
| Heat deflection temp., °C. 264 psi/66 psi load | 39/40 | 42/46 | 31/36 | 40/41 |
| Izod impact strength, ft-lb/in | 0.14 | 0.10 | 0.21 | 0.17 |
| Tensile strength, psi | 6300 | 8400 | 3900 | 7200 |
| Tensile modulus, psi | 360000 | 430000 | 260000 | 370000 |
| Flexural strength, psi | 9800 | 13500 | 6800 | 12300 |
| Flexural modulus, psi | 327000 | 415000 | 212000 | 391000 |
| Compression strength at failure, psi | 61000 | 51000 | 51000 | 61000 |
| Adhesion Properties: (cured 1 hr 125° C.) | | | | |
| Tensile shear strength, psi | 2700 | 3900 | 2600 | 3500 |
| T-peel strength, pli | 12.6 | 9.3 | 41.4 | 15.0 |

EXAMPLE 5

Adhesion Properties of Epoxy Systems Cured with Three-Component Blends

| | (6170) | |
|---|---|---|
| | -47A | -47B |
| Formulation, pbw | | |
| Liquid epoxy resin (EEW 188) | 100 | 100 |
| 6074-76 (JEFFAMINE ® D-400/Terephthalic Acid, 2/1) | 96 | 124 |
| Epon ® Curing Agent Y | 5 | 2 |
| JEFFAMINE ® D-400 | 10 | 7.2 |
| Adhesion Properties cured 1 hr 125° C. | | |
| Tensile shear strength, psi | 3700 | 2600 |
| T-peel strength, pli | 13.3 | 20.0 |

Excellent adhesion properties may also be obtained when curing with blends of the amidomaines with both an aromatic amine and an polyether amine.

EXAMPLE 6

Epoxy Properties Obtained after Curing with Amidoamines from JEFFAMINE? D-230 and Isophthalic or Terephthalic Acid (Elevated Temperature Cure)

|  | 6170-2A | 6170-2B | 6109-2A | 6109-10B |
|---|---|---|---|---|
| Formulation, pbw |  |  |  |  |
| Liquid epoxy resin (EEW 188) | 100 | 100 | 100 | 100 |
| JEFFAMINE ® D-230/TA, 4/1 mol/mol | 52 | — | — | — |
| JEFFAMINE ® D-230/IA, 4/1 mol/mol | — | 52 | — | — |
| JEFFAMINE ® D-230/IA, 2/1 mol/mol | — | — | 97 | 26.4 |
| JEFFAMINE ® D-230 | — | — | — | 26.4 |
| Properties of Cured ⅛-inch Castings cured 2 hours 80° C., 3 hours 125° C. |  |  |  |  |
| Shore D hardness, 0–10 sec | 67–64 | 70–67 | 70–67 | 80–76 |
| HDT, °C., 264 psi/66 psi load | 72–74 | 68/70 | 65/68 | 65/70 |
| Izod impact strength, ft-lb/in | 0.11 | 0.12 | 0.10 | 0.12 |
| Tensile strength, psi | 9300 | 9600 | 10100 | 10000 |
| Tensile modulus, psi | 370000 | 380000 | 430000 | 440000 |
| Elongation, % | 6.9 | 7.6 | 4.7 | 7.2 |
| Flexural strength, psi | 16200 | 16300 | 17000 | 16100 |
| Flexural modulus, psi | 440000 | 440000 | 483000 | 455000 |
| % wt gain, 24-hr water boil | 3.3 | 3.5 | 3.9 | 3.2 |
| Compression strength, psi | 36000 | 43000 | 34000 | 54000 |
| Adhesion Properties cured 1 hour 125° C. |  |  |  |  |
| Tensile shear strength, psi | 3600 | 3400 | 4600 | 3900 |
| T-peel strength, pli | 6.3 | 6.4 | 6.1 | 3.3 |

EXAMPLE 7

| Comparative Example | A | B | C | D | E |
|---|---|---|---|---|---|
| Formulation, pbw |  |  |  |  |  |
| Liquid epoxy resin (EEW 188) | 100 | 100 | 100 | 100 | 100 |
| JEFFAMINE ® D-230 | 32 | — | — | — | — |
| JEFFAMINE ® D-400 | — | 55 | — | — | — |
| 6011-98 (JEFFAMINE ® D-400/Terephthalic Acid, 2/1) | — | — | 158 | — | — |
| 6074-50 (JEFFAMINE ® D-400/Isophthalic Acid, 2/1) | — | — | — | 162 | — |
| Epon ® Curing Agent Y | — | — | — | — | 24 |
| Adhesion Properties cured 1 hr 125° C. |  |  |  |  |  |
| Tensile shear strength, psi | 4000 | 3900 | 1590 | 1290 | 2200 |
| T-peel strength, pli | 2.0 | 4.7 | 37.5 | 37.6 | 3.4 |

Formulations A and B both give high shear strength but low peel strength. Formulations C and D are the opposite; they give low shear strength but high peel strength. Formulation E gives moderate shear strength and low peel strength. None of the systems cured with single curing agents (either amine or amidoamine) had both high shear strength and high peel strength.

TABLE OF COMPOUNDS

JEFFAMINE ® D-230, D-400 and D-2000 are represented by the formula:

$$H_2NCH(CH_3)CH_2\text{—}[OCH_2CH(CH_3)]_xNH_2$$

wherein:

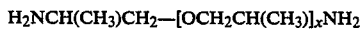

| JEFFAMINE ® | x(average) |
|---|---|
| D-2000 | 33.1 |
| D-400 | 5.6 |
| D-230 | 2.6 |

JEFFAMINE ® T-403 is represented by the formula:

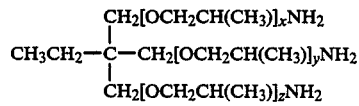

wherein x+y+z averages 5.3.

The use of these amines as epoxy resin curing agents is described in U.S. Pat. No. 4,189,564.

EEW—Equivalent Epoxy Weight

Epon ® Curing Agent Y is described in U.S. Pat. No. 4,554,342 issued November 19, 1983, to L. S. Corley (assigned to Shell Oil Co., Houston, Tex.) as a liquid aromatic amine having an amine nitrogen content of 14% to 16% by weight and a viscosity of 15 to 35 poise at 25° C., containing about 30% by weight o-toluenediamine and 70% by weight of an isomeric mixture of polymethylenepolyanilines.

| Table of Test Methods | |
|---|---|
| Shore D-Hardness 0–10 seconds | ASTM D-2240 |
| Elongation at Break (%) | ASTM D-638 |
| Heat Deflection Temperature (HDT) (°C., 264 psi/66 psi) | ASTM D-648 |
| Izod Impact Strength (ft lb/in) | ASTM D-256 |
| Tensile strength (psi) | ASTM D-638 |
| Tensile Modulus (psi) | ASTM D-638 |
| Flexural Strength (psi) | ASTM D-790 |
| Flexural Modulus (psi) | ASTM D-790 |
| T-peel strength (pli) | ASTM D-1876 |
| Tensile shear strength (psi) | ASTM D-1002 |
| Compression strength (psi) | ASTM D-695 |

While particular embodiments of the invention have been described, it is well understood that the invention is not limited thereto since modifications may be made. It is therefore contemplated to cover by the appended claims any such modifications as fall within the spirit and scope of the claims. For example, all effective amidoamine:co-curative ratios are anticipated.

What is claimed is:

1. An epoxy resin thermoset adhesive composition comprising the cured reaction product of:
   (A) a vicinal polyepoxide having an average of at least 1.8 reactive, 1,2-epoxy groups per molecule,
   (B) a curing amount of an admixture comprising
      (1) an amidoamine comprising the reaction product of one molar quanity of isophthalic acid or terephthalic acid with two molar quantities of polyoxypropylene amine of the formula:

$$H_2NCH(CH_3)CH_2\text{—}[OCH_2CH(CH_3)]_xNH_2$$

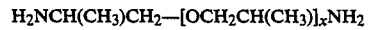

wherein: x ranges from 2 to 40.
   (2) a co-curative comprising an aliphatic polyetheramine, aromatic amine or mixture thereof.

2. The adhesive composition of claim 1 wherein the aliphatic polyetheramine is selected from the group represented by the formula:

$H_2NCH(CH_3)CH_2-[OCH_2CH(CH_3)]_yNH_2$ wherein y ranges from 2 to 40.

3. The adhesive composition of claim 1 wherein the aliphatic polyetheramine is selected from the group represented by the formula:

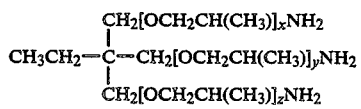

wherein x+y+z are numbers ranging from 1 to 15 and the sum of x, y and z ranges from 3 to 40.

4. An epoxy resin thermoset adhesive composition comprising the cured reaction product of:
(A) a vicinal polyepoxide having an average of at least 1.8 reactive, 1,2-epoxy groups per molecule,
(B) a curing amount of an admixture comprising
(1) an amidoamine comprising the reaction product of one molar quantity of isophthalic acid or terephthalic acid with two molar quantities of polyoxypropylene amine of the formula:

$H_2NCH(CH_3)CH_2-[OCH_2CH(CH_3)]_xHN_2$ wherein: x ranges from 2 to 40.

2 (2) a co-curative comprising an aliphatic polyetheramine selected from the group represented by the formula:

$H_2NCH(CH_3)CH_2-[OCH_2CH(CH_3)]_yNH_2$ wherein y ranges from 2 to 40, and wherein the ratio of amidoamine:co-curative ranges from 1:1 to 25:1.

5. The adhesive composition of claim 4 wherein the polyoxypropyleneamine is represented by the formula:

$H_2NCH(CH_3)CH_213 [OCH_2CH(CH_3)]_yNH_2$ wherein: y ranges from about 25 to 40, and the ratio of first curative:co-curative ranges from 1:1 to 10:1.

6. The adhesive composition of claim 4 wherein the polyoxypropyleneamine is represented by the formula:

$H_2NCH(CH_3)CH_2-[OCH_2CH(CH_3)]_yNH_2$ wherein: y ranges from about 4 to 25.

7. The adhesive composition of claim 4 wherein the polyoxypropyleneamine is represented by the formula:

$H_2NCH(CH_3)CH_2-[OCH_2CH(CH_3)]_yNH_2$ wherein: y ranges from about 2 to 4.

* * * * *